United States Patent [19]

Kobylinski et al.

[11] 3,912,657

[45] Oct. 14, 1975

[54] PROCESS FOR PREPARING RUTHENIUM PHOSPHATES AND USE THEREFOR

[75] Inventors: Thaddeus P. Kobylinski, Cheswick; Brian W. Taylor, Richland Township, both of Pa.

[73] Assignee: Gulf Research & Development Company, Pittsburgh, Pa.

[22] Filed: July 2, 1973

[21] Appl. No.: 375,533

[52] U.S. Cl............................. 252/437; 423/213.5
[51] Int. Cl................................................ B01j 11/82
[58] Field of Search .......... 252/437, 435; 423/213.5

[56] References Cited
UNITED STATES PATENTS

| | | | |
|---|---|---|---|
| 2,890,167 | 6/1959 | Haensel | 252/435 X |
| 2,993,010 | 7/1961 | Guyer | 252/437 X |
| 3,224,831 | 12/1965 | Stephens | 252/437 X |
| 3,370,914 | 2/1968 | Gross et al. | 423/213.5 |
| 3,706,815 | 12/1972 | Alley | 252/437 X |

*Primary Examiner*—Patrick P. Garvin

[57] ABSTRACT

Process for preparing novel ruthenium phosphates in which a mixture of (1) a phosphorus acid, a phosphorus oxide or a phosphorus salt; (2) ruthenium, a ruthenium oxide or a ruthenium salt; and (3) a refractory oxide is first treated with $H_2S$ or gaseous ammonia at a temperature of about 0° to about 50°C. and then calcined.

14 Claims, No Drawings

PROCESS FOR PREPARING RUTHENIUM PHOSPHATES AND USE THEREFOR

This invention relates to a process for preparing novel ruthenium phosphate compounds and to a process for reducing nitrogen oxides, especially in auto exhaust gases.

The reactants required to produce the novel ruthenium phosphates herein are (1) a phosphorus acid, a phosphorus oxide or a phosphorus salt, (2) ruthenium, a ruthenium oxide or a ruthenium salt, and (3) a refractory material selected from the group consisting of an aluminum oxide or salt, a titanium oxide or salt, silica, silica alumina, a magnesium oxide or salt, a zirconium oxide or salt or any combination of such refractory materials. Specific examples of each of the above reactants are (1) $P_2O_5$, $H_3PO_4$, $H_4P_2O_7$, etc.; (2) $RuO_2$, $RuCl_3$, etc.; and (3) $Al_2O_3$, $SiO_2$, $AlCl_3$, $Al(NO_3)_3$, $MgO$, $MgCl_2$, $zno_2$, $TiO_2$, silica alumina, etc. Optionally, a fourth component can be present: an oxide or salt of barium, calcium or strontium or any combination thereof. Specific examples of each of the fourth components are $BaO$, $BaO_2$, $Ba(OH)_2$, $CaO$, $Ca(OH)_2$, $SrO$, etc.

The molar ratio of the phosphorus component, the ruthenium component and the refractory component, based on the cationic portion thereof, is about 1:1:1 to about 1:200:20,000, preferably in the range of about 1:2:1 to about 1:100:2000, but most preferably in the range of about 1:4:1 to about 1:60:1000. If the fourth component is present, then the molar ratio of the phosphorus component, the ruthenium component, the refractory component and the fourth component, based on the cationic portion thereof, is about 1:1:1:1 to about 1:200:20,000:100, preferably about 1:2:1:1 to about 1:100:2000:50 but most preferably about 1:4:1:1 to about 1:60:1000:30.

The procedure involves heating the reactant mixture, as defined above, in an atmosphere containing molecular oxygen, such as air or oxygen itself, at a temperature of about 400° to about 1500° C., preferably about 500° to about 1300° C., and a pressure of about 0 to about 140 pounds per square inch gauge (about 0 to about 10 kilograms per square centimeter), preferably atmospheric pressure, for about one minute to about 36 hours, preferably for about 30 minutes to about 15 hours. The resulting mixture after thermal treatment is the desired compound.

The resultant compound obtained is a new compound containing phosphorus, ruthenium, the cationic portion of the refractory compound and oxygen. If an oxide or salt of barium, calcium or strontium is also present in the reaction mixture, barium, calcium or strontium will also be a component of the new compound. These compounds have been heated to extremely high temperatures and have been found to be stable. The X-ray patterns obtained with the present compounds are significantly different (indicating different compounds) from those obtained from the X-ray patterns of the novel ruthenium compounds disclosed and claimed in our copending Application Ser. No 375,902, filed concurrently herewith entitled RUTHENIUM PHOSPHATES AS NEW COMPOUNDS AND PROCESS OF USING SAME.

Since the novel compounds produced herein are extremely valuable for reducing nitrogen oxides in auto exhaust gases, as will be fully explained hereinafter, it is within the purview of the invention defined and claimed herein to employ the defined refractory material as both a reactant and as a support for the novel compounds. For example, a relatively large surface area refractory material, such as an alumina base, can be impregnated to any desired depth with a phosphorus compound, such as phosphoric acid, and a ruthenium compound, such as $RuCl_3$, in required amounts, as defined above, and the impregnated refractory can then be heated in an atmosphere containing molecular oxygen, also as defined above, to produce a refractory base material, suitable as catalyst, containing as a surface species the novel compound defined and claimed herein. In order to obtain a more uniform distribution of the catalyst, as a surface species, on the refractory base, it is desirable to impregnate the refractory base with the phosphorus component and the ruthenium component, as described, and then, prior to calcination, as described, subject the impregnated refractory base to a stream of gaseous ammonia or $H_2S$ at a temperature of about 0° to about 50° C., or even higher, for about one-half to about five hours, or even longer. We believe that such treatment prevents the phosphorus component and the ruthenium component from migrating prior to, and during, calcination.

In addition to the above, the novel ruthenium phosphates obtained herein can be subsequently applied to any of the refractory oxide supports well-known in the art, including the refractory supports defined above, such as those prepared from alumina, silica, magnesia, thoria, titania, zirconia, silica-aluminas, silica-zirconias, magnesia-aluminas, etc. In addition, the support can be an activated carbon, pumice, etc. Other suitable supports include the naturally-occurring clays, such as diatomaceous earth. In general, the surface area of these supports can be from about $10m^2$ to about $500m^2$ per gram, preferably from about $20m^2$ to about $300m^2$ per gram. Additional desirable supports for use herein are the more-recently developed corrugated ceramic materials made, for example, from alumina, silica, and magnesia, lithium, etc. An example of such ceramic material is Therma Comb made by American Lava Corporation, Chattanooga, Tenn., which is more fully described in U.S. Pat. No. 3,444,925. If desired, the ruthenium phosphates can be mounted directly onto the surface of the ceramic material, the ceramic material can first be coated with a refractory oxide, such as defined above, prior to the deposition of ruthenium phosphates thereon or ruthenium phosphate can be combined with the refractory oxide and the resultant combination can then be deposited on the ceramic material. The ceramic materials per se have a low surface area and high heat stability, and the addition of the refractory oxide coating increases the surface area to a more desirable range. In addition, these coated ceramics possess the further advantage of being easily formed in one piece. Very little, if any, pressure drop is experienced by the passage of exhaust gases through such ceramic materials.

In our application Ser. No. 207,545, filed Dec. 13, 1971, now U.S. Pat. No. 3,784,675, we have disclosed and claimed a process for the reduction of nitrogen oxides in exhaust gases from internal combustion engines to selectively form nitrogen as substantially the only nitrogen-containing product by contacting such gases at elevated temperatures in a reducing atmosphere with selected amounts of ruthenium.

The treated gases are then contacted in a second stage with an oxidation catalyst, such as platinum, under oxidation conditions to convert unburned hydrocarbons and carbon monoxide to carbon dioxide and water. Since the second stage is further removed from the engine than the first, it will reach operative temperature levels later than the first. Accordingly, during the initial stages of operation, for example, from about 20 seconds to about 2 minutes after start-up, unburned hydrocarbons and carbon monoxide will not be satisfactorily oxidized in the second stage until adequate oxidation temperature levels are reached therein.

The first stage containing ruthenium can be used for oxidation during the initial stages of operation to provide a satisfactory solution to the problem. For example, during the initial stages of operation, oxygen can be introduced into the first stage in amounts sufficient to create an oxidation atmosphere therein so that oxidation of unburned hydrocarbons and carbon monoxide takes place in the presence of ruthenium therein. Since operation of the engine during the initial stages is under closed choke with a rich fuel mixture, nitrogen oxide emissions are low and no urgency exists to convert whatever nitrogen oxides are produced to nitrogen. After initial operation, the temperature in the second stage will quickly reach oxidation temperture levels. Then the oxygen flow is terminated to the first stage reactor but is made to the second stage oxidation reactor. Thereafter reducing conditions are maintained in the first stage and oxidation in the second and each stage then functions in its intended manner. Occasionally, too, perhaps because of some malfunction, excess oxygen can be present in the gases entering the first stage reactor sufficient to create, temporarily, an oxidizing atmosphere therein.

Industrial gases containing nitrogen oxides can also be treated with ruthenium and added fuel at elevated temperatures in a reducing atmosphere to convert the nitrogen oxides selectively to nitrogen as substantially the only nitrogen-containing product. Examples of these gases are coke oven gases and waste or tail gases from the oxidation of ammonia to produce nitric acid. Here, too, the amount of oxygen in the gaseous mixture may occasionally rise to a level sufficient to create an oxidizing atmosphere in the treating zone.

We have found that in all such cases wherein ruthenium is subjected to an oxidizing atmosphere, ruthenium has a tendency to volatilize, perhaps as ruthenium oxides, for example, as $RuO_3$ and $RuO_4$, known to be highly volatile and toxic, which can then escape from the reaction zone with the exit gases. Depletion of ruthenium, especially since it is an expensive metal, is detrimental to continued operation of the first stage reactor. In addition, since it is believed that ruthenium oxides may be toxic, its escape into the atmosphere is obviously undesirable and harmful.

We have found that if the novel ruthenium compounds defined hereinabove are employed in place of ruthenium in said U.S. Pat. No. 3,784,675, the volatility problems referred to above are overcome and yet the desired conversion of nitrogen oxides to nitrogen as substantially the only nitrogen-containing product, without the formation of appreciable amounts of ammonia, is still obtained. The ability of the ruthenium phosphates to function as reducing catalysts herein is not appreciably affected by their being subjected to intermittent or prolonged oxidizing atmospheres.

The gas mixtures of primary interest for treatment in accordance with the process of this invention are those gas mixtures produced by the combustion of a hydrocarbon fuel using air, such as the exhaust gases from an internal combustion engine utilizing a hydrocarbon-type fuel. By "an internal combustion engine" we mean to include an engine having a combustion chamber wherein a hydrocarbon fuel is burned with molecular oxygen and the products of combustion are used to drive moving parts, such as a piston, rotors, etc. These hydrocarbon fuel exhuast gases contain small concentrations of NO and $NO_2$ where usually the mol ratio of NO to $NO_2$ exceeds 1:1. An automobile exhaust gas that can be treated in accordance with the process defined and claimed herein would have a composition whose major components would be as shown in Table A below:

Table A

| | Components | Broad Range, Mol Per Cent | Usual Range, Mol Per Cent |
|---|---|---|---|
| 1) | $NO_x$, where x is 1 or 2 | 50–5000 ppm[2] | 100–3500 ppm[2] |
| 2) | Free molecular oxygen | 0 to 5 | 0.5 to 2 |
| 3) | Free molecular hydrogen | 0.1 to 4 | 0.2 to 1 |
| 4) | CO | 0.2 to 8 | 0.4 to 2 |
| 5) | Hydrocarbons[1] | 0–4000 ppm[2] | 50–1000 ppm[2] |
| 6) | $H_2O$ | 5 to 16 | 10 to 13 |
| 7) | $CO_2$ | 5 to 16 | 10 to 13 |
| 8) | Lead (as metal) | 0–12 ppm[2] | 0–4 ppm[2] |
| 9) | Nitrogen | 53 to 89 | 68 to 78 |

[1]Calculated as carbon
[2]By volume

Coke oven gases that can be treated with the ruthenium compounds herein could have a composition whose major components, except nitrogen, are shown in Table B. The remainder of these gases consist almost solely of nitrogen.

Table B

| | Components | Broad Range, Mol Per Cent | Usual Range, Mol Per Cent |
|---|---|---|---|
| 1) | $H_2$ | 4 to 70 | 40 to 60 |
| 2) | CO | 5 to 90 | 7 to 15 |
| 3) | $O_2$ | 0 to 1 | 0.02 to 0.8 |
| 4) | $CH_4$ | 0.5 to 40 | 20 to 35 |
| 5) | $C_2H_4$ | 0.5 to 4 | 1 to 2 |
| 6) | $C_2H_2$ | 0 to 1 | 0.1 to 0.3 |
| 7) | $NO_x$, where x is 1 or 2 | 10 to 2000 ppm[2] | 20 to 500 ppm[1] |

[1]By volume

Waste gases from the oxidation of ammonia to produce nitric acid that can also be treated herein with added fuel will have from about 0.05 to about 0.8 mol per cent $NO_x$, generally from about 0.1 to about 0.5 mol per cent $NO_x$, where x is 1 or 2, from about 1.0 to about 6.0 mol per cent oxygen, generally from about 2.5 to about 4.2 mol per cent oxygen, with the remainder being substantially all nitrogen and some water.

In order to selectively reduce substantially all of the nitrogen oxides in the gaseous mixtures to be treated herein to form nitrogen as substantially the only nitrogen-containing compound, without the formation of significant amounts of ammonia, we simply pass such gaseous mixtures into contact with the novel ruthenium phosphate defined hereinabove at elevated temperatures in a reducing atmosphere. By "substantially all of the nitrogen oxides" we mean that at least about 75 mol per cent of the nitrogen oxides are converted herein, preferably at least about 85 mol per cent, but most preferably at least about 90 mol per cent. In general, by following the procedure defined herein no more than about nine weight per cent of the nitrogen oxides in the gaseous mixture to be treated are converted to ammonia, but in most instances less than about three weight per cent are converted to ammonia.

In order to convert substantially all of the nitrogen oxides in the gaseous mixtures to be treated herein to form nitrogen as substantially the only nitrogen-containing compound, without the formation of ammonia, it is imperative that the ruthenium phosphate be used in catalytically effective amounts. For example, the ruthenium phosphate is used in an amount such that the ruthenium component thereof, as metal, is present in the range of about 0.003 to about 0.5 Troy ounce of ruthenium per 1000 cubic feet of gas being treated per hour, preferably from about 0.008 to about 0.3 Troy ounce of ruthenium per 1000 cubic feet of gas being treated per hour, but most preferably from about 0.01 to about 0.2 Troy ounce of ruthenium per 1000 cubic feet of gas being treated per hour. In general, for example, during idling an internal combusion engine, particularly of the automotive type, can produce as low as about 600 cubic feet per hour of exhaust gas and at extremely high speeds, for example, at speeds in excess of about 60 miles per hour, can produce as high as about 12,000 cubic feet per hour of exhaust gas, but in general from about 1500 to about 8000 cubic feet per hour of exhaust gas will be produced at speeds below about 60 miles per hour.

A critical requirement to obtain conversion of nitrogen oxides herein is that an effective reducing atmosphere be maintained in the reaction zone. The concentration of molecular oxygen in the gaseous mixture being treated has no adverse effect on the metal ruthenium phosphate catalyst, as used herein, provided a reducing atmosphere is maintained during the reaction. By "reducing atmosphere" we mean an atmosphere wherein the stoichiometric ratio of molecular oxygen to the reducing agents in the reaction zone is less than 1:1, preferably about 0.9:1 or less. By "stoichiometric ratio of molecular oxygen to the reducing agents" we mean the amount of oxygen stoichiometrically required to convert the reducing agent or agents to their higher oxidation states. By "reducing agent" we mean to include substances which can be oxidized in the reaction zone by molecular oxygen, for example, substances such as hydrogen and carbon monoxide which can be converted to water and carbon dioxide, respectively.

The temperature required for the desired reduction herein can be varied over wide limits. Thus, the temperature can be as low as about 245' C. and as high as about 1205° C., or even higher, but, in general, we prefer to employ a temperature in the range of about 425° C. to about 760° C.

The reaction pressure is not critical and suitable pressures of about 0 to about 140 pounds per square inch gauge (about 0 to about 10 kilograms per square centimeter) are satisfactory, but, preferably, the pressure is about atmospheric or slightly above.

The ruthenium phosphate employed herein can be employed at both high and low gas hourly space velocities (GHSV), i.e., at about 8000 to about 200,000, or even higher, volumes of gas per hour per volume of catalyst. Here, as elsewhere in this specification, volumes are defined as being standard conditions, that is 760 mm Hg and 0° C.

The ruthenium phosphate catalyst is, of course, primarily meant to be utilized as part of a reactor system to be attached at any suitable location in the exhaust system of an automobile. The temperature of the reactor system can suitably be regulated to the desired temperature by the position of the reactor with respect to the gases exiting from the internal combustion engine. The further from the engine the reactor is placed, the cooler will be the gases entering the reactor. It may also be desirable to utilize some of the exhaust gases initially to preheat the reactor catalyst chamber before the gases enter into the catalyst chamber. A suitable means of doing this could be that described by Meguerian and Lange in the Paper "$NO_x$ Reduction Catalysts For Vehicle Emissioni Control," published by the Society of Automotive Engineers, Inc. and presented as part of the Automotive Engineering Congress Meeting in Detroit, Mich. on Jan. 11–15, 1971.

It is also important with automotive exhaust gases to not only remove nitrogen oxides but also to remove unburned hydrocarbons and carbon monoxide. The removal of the unburned hydrocarbon and carbon monoxide can easily be achieved by an oxidation reaction using known catalysts under known oxidizing conditions. This oxidation must occur, however, in the substantial absence of ammonia, since ammonia will quickly reoxidize to form undesirable nitrogen oxides. By the use of the ruthenium phosphate catalyst, utilizing the conditions as set forth herein, to obtain a product having substantially no ammonia, the product gases can then be oxidized in a second-stage converter utilizing oxidation catalysts, which are well-known in the art, under oxidation conditions to oxidize any unburned hydrocarbons and carbon monoxide to non-polluting gases such as carbon dioxide and water. Usually combustion air is pressurized into the $NO_x$-free gases at a flow rate such that the average temperature of the catalyst bed is maintained at a level from about 800° to about 1700° F., preferably a temperature of 900° 1100° F. Any of the metals of Group VIII, for example, platinum, palladium, etc. can successfully be employed in the oxidation of unburned hydrocarbons and CO to produce $CO_2$ and water in the presence of a combustion gas such as air. In addition, copper, vanadium or chromium-containing catalysts can also be used. Similarly, the ruthenium phosphates disclosed herein can also be used in the oxidation stage. The metals are usually distended on a support which can be the same as the supports described above for use with the ruthenium catalyst Other typical oxidation catalysts, conditions and operational procedures can be the same as described in U.S. Pat. No. 3,503,715 to Haensel and the teachings of this patent are incorporated herein by reference. Still another procedure for the oxidation of unburned hydrocarbons and CO with molecular oxygen in the presence of oxidation catalysts, including ruthenium, is claimed in U.S. Pat. No. 3,257,163 to Stiles.

The invention will be further described with reference to the following experimental work.

In the event the novel ruthenium phosphates obtained herein are used as catalysts wherein oxidative conditions can exist and high temperatures can be employed, for example, during the start-up period of the operation of an internal combustion engine, some, or all, of the heating step defined above required to prepare the novel ruthenium phosphates can be employed.

EXAMPLE 1

A ceramic monolith weighing 400 grams, and carrying on the surface thereof about 30 grams of gamma alumina (the total surface area of the material was approximately 15 square meters per gram) was immersed in 400 cc of an aqueous solution containing 3.28 grams of $RuCl_3$, 60.77 grams of $H_3PO_4$ and 2.11 grams of aluminum chloride for 2 hours. The impregnated monolith was dried in air at 120° C. for 6 hours and then calcined in air for 12 hours at a temperature of 550° C. The resulting catalyst contained 0.1 weight per cent ruthenium as an element.

EXAMPLE 2

The run of Example 1 was repeated except that prior to drying, the impregnated monolith was exposed to a flow of ammonia gas, at the rate of 200 cc per minute at room temperature for two hours. Visual observation of the calcined product indicated a much more uniform distribution of the black ruthenium phosphate on the surface thereof than that obtained in Example 1.

EXAMPLE 3

When Example 2 was repeated but gaseous $H_2S$ was used in place of gaseous $NH_3$, similar results were obtained.

EXAMPLE 4

Example 2 was repeated, except that 40.94 grams of $P_2O_5$ were used in place of $H_3PO_4$. Similar results were obtained.

EXAMPLE 5

A ceramic monolith was immersed in 400 cc of an aqueous solution containing 7.54 grams of $RuCl_3$, 139.77 grams of $H_3PO_4$ and 4.85 grams of aluminum chloride for three hours. The wet monolith was exposed to a flow of ammonia gas, at the rate of 200 cc per minute, at room temperature for 3 hours. The treated monolith was dried in air for 6 hours at 120° C. and then calcined in air at 650° C. for six hours. The resulting catalyst contained 0.1 weight per cent ruthenium as an element.

EXAMPLE 6

Each of Examples 1 through 4 was repeated, but in each instance the $AlCl_3$ was omitted. In this case, reaction took place with the ruthenium compound and the surface gamma alumina of the treated monolith.

EXAMPLE 7

Example 1 was repeated, except that in place of $AlCl_3$, 4.85 grams of barium acetate was employed. In this case, the reactants were the ruthenium component, the phosphorus component, the surface alumina of the coated monolith and the barium acetate.

EXAMPLE 8

Example 1 was repeated but $H_3PO_4$ and $AlCl_3$ were not used and the calcination temperature was 480° C.

EXAMPLE 9

Samples of catalysts made according to Examples 1 and 2 were heated in air for 6 hours at 1000° C. and then examined by X-ray diffraction and showed the presence of small amounts of $RuO_2$ and alpha alumina. The phase present in a major amount could not be identified with any known patterns of ruthenium compounds from X-ray powder data files and was different from any of the X-ray patterns of the compounds obtained in our said copending Application. Elemental analysis of the catalyst obtained indicated 0.1 weight per cent ruthenium, 2.1 weight per cent phosphorus, 15.5 weight per cent aluminum, 20.0 weight per cent silicon, 11.0 weight per cent iron and 9.8 weight per cent magnesium. The presence of a stable chemical compound was shown (by X-ray analysis) by the stability of the major phase even after prolonged heating in air for 6 hours at 1000° C.

In contrast to the above, when the sample prepared in Example 8 was examined by X-ray techniques, alpha alumina was found to be the major phase and $RuO_2$ the minor phase. The presence of only small amounts of $RuO_2$ is due to the volatilization thereof at prolonged exposure in air at 1000° C.

EXAMPLE 10

Two catalysts were prepared, one as in Example 1, the second as in Example 8, except that the amount of $RuCl_3$, $AlCl_3$ and $H_3PO_4$, when used, in each instance was 2½ times the amounts used in the earlier examples. Each of the samples was initially calcined in air at 120° c. for 6 hours and then analyzed by X-ray fluorescence in order to determine quantitatively the amount of ruthenium present. Each sample was then additionally calcined in air at 1000° C. and the X-ray analysis repeated. Analytical results obtained are tabulated below in Table 1.

Table 1

| Temp. of Calcination, °C. | Weight Per Cent Ruthenium In | |
|---|---|---|
| | Catalyst Prepared As In Example 1 | Catalyst Prepared As In Example 8 |
| 120 | 0.25 | 0.25 |
| 1000 | 0.25 | 0.09 |

The above clearly shows that the novel ruthenium phosphates obtained herein are extremely stable when exposed to molecular oxygen at elevated temperatures.

EXAMPLE 11

Four idential monolith catalysts were prepared according to Example 4 and then additionally exposed to flowing air for two additional hours at the temperatures specified below in Table II. Each catalyst was loaded separately in a platinum bucket suspended to one arm of a Cahn microbalance and then enclosed in a quartz tube. Air was then passed over each catalyst at 960° C. and the weight changes were recorded as shown below in Table II. A ruthenium catalyst prepared as in Example 8 was similarly treated and tested. In each instance the absolute amount of ruthenium on the catalyst being studied was 25 milligrams.

Table II

| Catalyst Prepared As In Example | Components Of The Catalyst | Additional Exposure To Air, °C. | Per Cent Weight Change In Time | | |
|---|---|---|---|---|---|
| | | | Between 0–1 Hour | Between 1–5 Hours | Between 5–36 Hours |
| 4 | Ru, P, Al | 500 | −7.0 | 0 | −10.0 |
| 4 | Ru, P, Al | 670 | −5.6 | 0 | 0 |
| 4 | Ru, P, Al | 810 | 0 | 0 | 0 |
| 4 | Ru, P, Al | 1200 | 0 | 0 | 0 |
| 8 | Ru | 1000 | −2.4 | −9.6 | −70.4 |

The extreme stability of the new compounds prepared herein when exposed to molecular oxygen, especially when they have been subjected to thermal treatment at extremely elevated temperature, is apparent from the data in Table II. This is in extreme contrast to the catalyst of Example 8 wherein at the end of 36 hours of exposure to air substantially all of the ruthenium was lost.

EXAMPLE 12

Four catalysts were prepared in the identical matter described in Example 3, except that the calcination temperature in each instance was as set forth below in Table III, and then exposed to a flow of hydrogen at the rate of 60 cc per minute at 950° C. for six hours to ascertain its stability after use in a reducing atmosphere. The catalyst was then flushed with nitrogen and air was passed over the catalyst at the rate of 100 cc per minute at 950°C. for 24 hours to evaluate its weight loss. A similar test was conducted with the catalyst as prepared in Example 8.

Table III

| Catalyst Prepared As In Example | Calcination Temperatures, °C. | Components Of The Catalyst | Per Cent Weight Change In 24 Hours |
|---|---|---|---|
| 3 | 500 | Ru, P, Al | 0 |
| 3 | 670 | Ru, P, Al | 0 |
| 3 | 810 | Ru, P, Al | 0 |
| 3 | 1200 | Ru, P, Al | 0 |
| 8 | 850 | Ru | −47 |

In the above Example it can be seen that the catalyst prepared herein can be subjected to reducing conditions followed by oxidation conditions with no loss of catalyst, while a substantial amount of ruthenium is lost under similar conditions when the catalyst contains solely ruthenium.

EXAMPLE 13

A gas containing 0.5 weight per cent NO, 2.0 weight per cent CO, 2.0 weight per cent $H_2$ and 95.5 weight per cent argon was passed over 15 grams of the catalyst prepared according to Example 1 at a flow rate of 24,000 gas hourly space velocity (measured at standard temperature and pressure) atmospheric pressure and at various temperature levels as shown below in Table IV. It can be seen that operation using the novel catalyst herein within defined reaction conditions results in substantial conversion of NO with no appreciable formation of ammonia.

Table IV

| Temp., °C. | Weight Per Cent NO Converted | Weight Per Cent Of NO Converted To $NH_3$ |
|---|---|---|
| 232 | 45.0 | Not measured |
| 254 | 88.0 | 6.7 |
| 271 | 98.0 | 5.0 |
| 371 | 99.0 | 5.0 |
| 482 | 99.0 | 3.0 |

EXAMPLE 14

A gas having the idential composition of Example 13 was passed under the same flow conditions over 15 grams of the catalyst of Example 7 at selected temperature levels with the following results, as shown in Table V below:

Table V

| Temp., °C. | Weight Per Cent Converted | Weight Per Cent NO To $NH_3$ |
|---|---|---|
| 240 | 39.0 | Not measured |
| 261 | 97.0 | 5.2 |
| 395 | 99.0 | 3.0 |
| 501 | 99.0 | 2.0 |

Again Table V shows excellent results are obtained when the novel catalysts obtained herein are used under the defined conditions.

EXAMPLE 15

A catalyst prepared according to Example 1 was employed to reduce NO using either $H_2$ or $CO_2$ as a reducing agent. Two feeds were used, Feed I consisting of 0.3 weight per cent NO, 2.0 weight per cent CO and 5.0 weight per cent $H_2O$ and Feed II consisting of 0.3 weight per cent NO, 2.0 weight per cent $H_2$ and 5.0 weight per cent $H_2O$. In each case the gases were passed over the catalysts at a gas hourly space velocity of 25,000. Results obtained are tabulated below in Table VI.

Table VI

| Temp., °C. | Weight Per Cent NO Converted | | Weight Per Cent NO Converted To $NH_3$ In Feed II |
|---|---|---|---|
| | Feed I | Feed II | |
| 204 | 10.0 | 0 | Not measured |
| 233 | 37.0 | 0 | Not measured |
| 260 | 93.0 | 0 | Not measured |
| 288 | 99.0 | 8.0 | Not measured |
| 316 | 99.0 | 17.0 | Not measured |
| 344 | 99.0 | 25.0 | Not measured |
| 374 | 99.0 | 40.0 | Not measured |
| 395 | 99.0 | 56.0 | Not measured |
| 426 | 99.0 | 91.0 | 9.2 |
| 456 | 99.0 | 99.0 | 3.1 |

Table VI-continued

| Temp., °C. | Weight Per Cent NO Converted | | Weight Per Cent NO Converted To NH₃ In Feed II |
|---|---|---|---|
| | Feed I | Feed II | |
| 488 | 99.0 | 99.0 | 2.3 |

It can be seen from the above that both CO and $H_2$ are excellent reducing agents for NO at elevated temperatures using the novel ruthenium phosphates prepared herein.

EXAMPLE 16

The run of Example 15 was repeated using a feed containing 0.3 weight per cent NO, 2.0 weight per cent CO, 2.0 weight per cent $H_2$ and 5.0 weight per cent $H_2O$ with similar results. The data obtained are set forth below in Table VII.

Table VII

| Temp., °C. | Weight Per Cent NO Converted | Weight Per Cent NO Converted To NH₃ |
|---|---|---|
| 200 | 11.0 | Not measured |
| 235 | 39.0 | Not measured |
| 258 | 93.0 | 5.1 |
| 289 | 99.0 | 9.8 |
| 320 | 99.0 | 9.5 |
| 356 | 99.0 | 9.0 |
| 374 | 99.0 | 3.3 |
| 399 | 99.0 | 2.1 |
| 427 | 99.0 | 1.0 |

We believe the above shows that when both $H_2$ and CO are present using the novel catalyst herein, NO reacts preferentially with NO to form $N_2$. Since there is little tendency for $H_2$ to react with NO, the formation of $NH_3$ is minimized.

EXAMPLE 17

Two catalysts prepared as in Examples 2 and 3, each having a total volume of 0.7 liters, were placed in two stainless steel mufflers. The amount of ruthenium, calculated as element, was 0.1 weight per cent of the total catalyst weight. Each of the mufflers was attached to the exhaust manifold of a Chevrolet V–8 engine having a displacement of 5733 cc and equipped with exhaust gas recirculation. During the operation the exhaust gases contained from 300 to 550 parts per million of nitrogen oxides, from 0.6 to 1.8 weight per cent of CO, and from 0.3 to 0.8 weight per cent $O_2$. The engine was operated in the range of from 600 RPM (idle) to 4000 RPM (above 70 miles per hour or 118 kilometers per hour). Space velocities were from 45,000 to 200,000.

Each of the converters was attached to each manifold and was followed by another converter containing 0.6 weight per cent platinum on a ceramic support. The platinum-containing converter was equipped with air injection in order to oxidize $NH_3$ formed in the converters containing the ruthenium phosphates quantitatively. By comparing the amount of nitrogen oxides in the exit gases from the ruthenium phosphate converter and in the exit gases from the platinum converter, the amount of nitrogen oxides converted to $NH_3$ could be determined. In addition, the ruthenium phosphate converters were equipped with separate air inlets so that they could be exposed to an oxidative environment at high temperatures when desired. The experiment was carried out over a period of 120 hours and the data obtained was consistent during the run. The data obtained are tabulated below in Table VIII.

Table VIII

| Temp. °C. | Ruthenium Phosphate Converters | | Platinum Converter | | Mol % Weight % Nitrogen Oxides Converted | Selectivity | Nitrogen Oxides Converted To NH₃ |
|---|---|---|---|---|---|---|---|
| | Nitrogen Oxides In Inlet, PPM | Nitrogen Oxides In Outlet, PPM | Nitrogen Oxides In Inlet, PPM | Nitrogen Oxides In Outlet, PPM | | | |
| 549 | 500 | 20 | 20 | 40 | 96 | 92 | 4.1 |
| 643 | 510 | 25 | 25 | 41 | 95.1 | 91.9 | 3.3 |
| 488 | 400 | 20 | 20 | 50 | 95.0 | 87.7 | 7.8 |
| 595* | 410 | 22 | 22 | 40 | 94.7 | 90.2 | 4.6 |
| 623* | 480 | 20 | 20 | 38 | 95.9 | 92.0 | 3.9 |

*The ruthenium phosphate catalyst had previously been used as an oxidation catalyst continuously for 48 hours at 760° C.

Selectivity in the above Table was calculated as follows:

$$\text{Selectivity} = \frac{\left(\begin{array}{c}\text{Nitrogen Oxide}\\\text{content of}\\\text{Gases To}\\\text{Ruthenium}\\\text{Catalyst}\end{array}\right) - \left(\begin{array}{c}\text{Nitrogen Oxide}\\\text{Content Of}\\\text{Gase After}\\\text{Platinum}\\\text{Catalyst}\end{array}\right)}{\begin{array}{c}\text{(Nitrogen Oxide Content of}\\\text{(Gases To Ruthenium Catalyst)}\end{array}} \times 100$$

The above data further show that the catalyst defined and claimed herein is effective in converting nitrogen oxides to nitrogen without appreciable formation of $NH_3$, even when such catalyst has been subjected to oxidation conditions at elevated temperatures for a long period of time.

EXAMPLE 18

The process of Example 17 was repeated, except that the catalyst used was prepared in accordance with the procedure of Example 4. Results obtained were substantially identical to those obtained in Example 17.

Obviously, many modifications and variations of the invention, as hereinabove set forth, can be made without departing from the spirit and scope thereof, and, therefore, only such limitations should be imposed as are indicated in the appended claims.

We claim:

1. A process for preparing a new composition which consists essentially of contacting a mixture consisting essentially of (1) a phosphorus acid or a phosphorus oxide, (2) ruthenium, a ruthenium oxide or an inorganic ruthenium salt and (3) a refractory material selected from the group consisting of an aluminum oxide or an inorganic aluminum salt, silica, silica alumina, a magnesium oxide or an inorganic magnesium salt, and combinations of such refractory materials, wherein the molar ratio of said phosphorus component, said ruthenium component and said refractory component, based on the cationic portion thereof, is about 1:1:1 to about 1:200:20,000, with gaseous ammonia or $H_2S$ at a temperature of about 0° to about 50° C. for about one-half to about 5 hours and then heating said mixture in an atmosphere containing molecular oxygen at a temperature of about 400° to about 1500° C. and a pressure of about 0 to about 140 pounds per square inch gauge for about one minute to about 36 hours to obtain a novel ruthenium phosphate.

2. The process of claim 1 wherein the latter heating step is carried out at a temperature of about 500° to about 1300° C. and about atmospheric pressure for about 30 minutes to about 15 hours.

3. The process of claim 1 wherein the phosphorus component, the ruthenium component and the refractory component, based on the cationic portion thereof, on a molar basis, is in the range of about 1:2:1 to about 1:100:2000.

4. The process of claim 1 wherein the phosphorus component, the ruthenium component and the refractory component, based on the cationic portion thereof, on a molar basis, is in the range of about 1:4:1 to about 1:60:1000.

5. The process of claim 1 wherein the ruthenium component is $RuCl_3$.

6. The process of claim 1 wherein the phosphorus component is $H_3PO_4$.

7. The process of claim 1 wherein the phosphorus component is $P_2O_5$.

8. The process of claim 1 wherein the refractory component is $AlCl_3$.

9. The process of claim 1 wherein the refractory component is aluminum oxide.

10. The process of claim 1 wherein the refractory component is magnesium oxide.

11. The process of claim 1 wherein the refractory component is silica.

12. The process of claim 1 wherein the ruthenium component and the phosphorus component are added to a support composed of said refractory component prior to treatment with ammonia gas or $H_2S$.

13. The process of claim 12 wherein ammonia gas is passed over said mixture prior to heating.

14. The process of claim 12 wherein $H_2S$ gas is passed over said mixture prior to heating.

* * * * *

UNITED STATES PATENT OFFICE
CERTIFICATE OF CORRECTION

PATENT NO. : 3,912,657
DATED : October 14, 1975
INVENTOR(S) : Thaddeus P. Kobylinski and Brian W. Taylor It is certified that error appears in the above-identified patent and that said Letters Patent are hereby corrected as shown below:

Col. 4, line 52, "10 to 2000 ppm$^2$" should read --10 to 2000 ppm$^1$--.

Col. 6, line 20, "Emissioni Control," should read --Emission Control,".

Col. 6, line 44, "900° 1100° F." should read --900° to 1100° F.--.

Col. 7, line 43, "139,77" should read --139.77--.

Col. 7, line 55, "ruthenium compound and the" should read --ruthenium compound, the phosphorus compound and the --.

Col. 10, lines 34 & 35, (middle column of table), "Weight Per Converted" should read --Weight Per Cent NO Converted--.

Col. 10, lines 34 & 35, (laST column of table), "Cent NO To NH$_3$" should read --Cent NO Converted To NH$_3$--.

Col. 12, under Table VIII, (6th column in the table), "Mol % Weight % Nitrogen Oxides Converted" should read --Weight % Nitrogen Oxides Converted--.

Col. 12, under Table VIII, (8th column in the table), "Nitrogen Oxides Converted to NH$_3$" should read --Mol % Nitrogen Oxides Converted to NH$_3$--.

Signed and Sealed this thirteenth Day of April 1976

[SEAL]

Attest:

RUTH C. MASON
Attesting Officer

C. MARSHALL DANN
Commissioner of Patents and Trademarks